United States Patent [19]

Russell

[11] Patent Number: 4,538,859
[45] Date of Patent: Sep. 3, 1985

[54] AUXILIARY MECHANICAL AND PHYSICALLY CONTROLLED ELECTRONIC ACTUATED AIR PRESSURE HANDLING APPARATUS FOR TRUCK AND TRAILER BRAKING SYSTEMS

[76] Inventor: Carl D. Russell, #30 Ramm's Ct., Hwy. 59, Sallisaw, Okla. 74955

[21] Appl. No.: 402,095

[22] Filed: Nov. 7, 1983

[51] Int. Cl.³ .......................... B60T 8/00; B60T 15/58
[52] U.S. Cl. .................................... 303/24 R; 303/61
[58] Field of Search ...................... 303/61, 24, 15, 10, 303/11, 7, 13; 188/275, 139, 135, 138, 137, 140, 161, 158, 112

[56] References Cited

U.S. PATENT DOCUMENTS

| | | | |
|---|---|---|---|
| 2,184,557 | 12/1939 | Lloyd | 303/24 C X |
| 2,924,306 | 2/1960 | Martin | 303/24 C |
| 3,276,802 | 10/1966 | Lister et al. | 303/61 X |
| 3,617,098 | 11/1971 | Leiber | 303/61 X |

FOREIGN PATENT DOCUMENTS 2814479 10/1978 Fed. Rep. of Germany ........ 303/61

Primary Examiner—Douglas C. Butler

[57] ABSTRACT

An auxiliary manual and physically controlled electronic-actuated air pressure handling apparatus for air-braking systems induced into the braking system to become a tool to aid the operator in providing rapid OFF-and-ON or conventional braking, the selection of which is determined by the road surface and the traction thereof.

2 Claims, 14 Drawing Figures

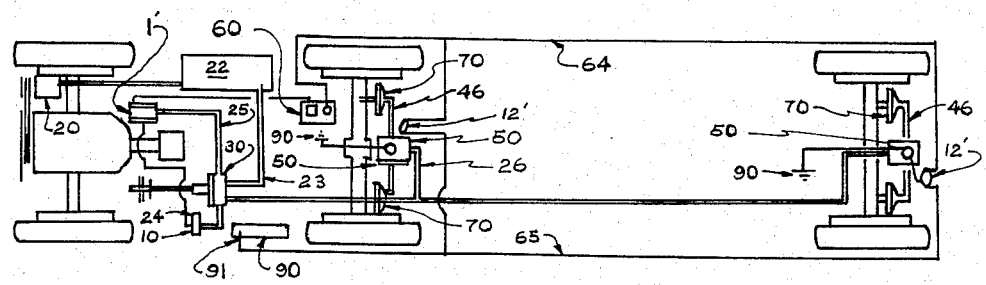
FIG 1
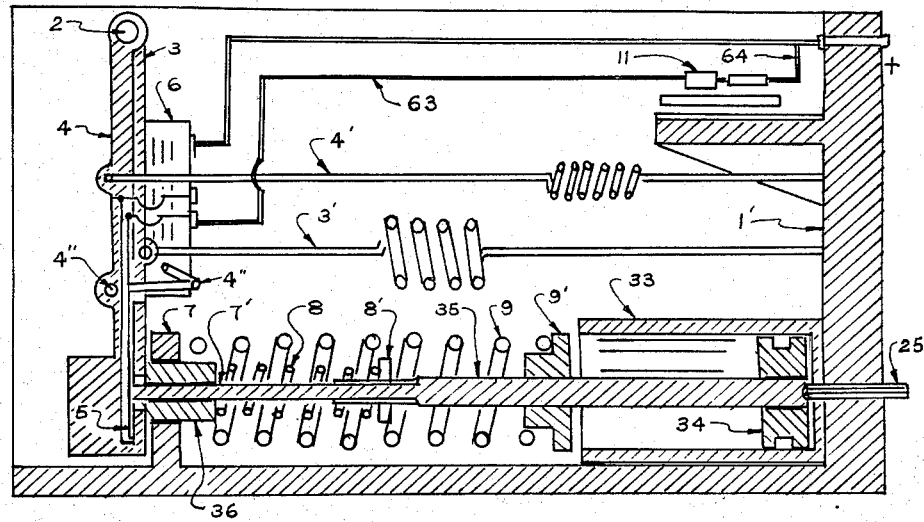
FIG 2
FIG 3

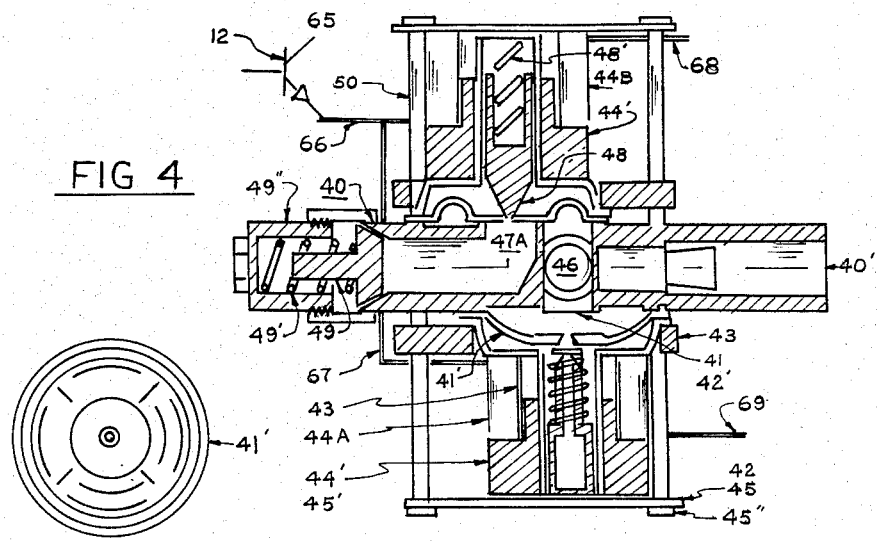
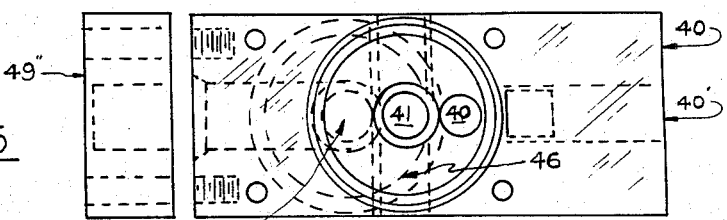
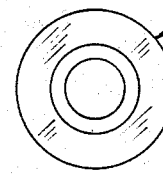
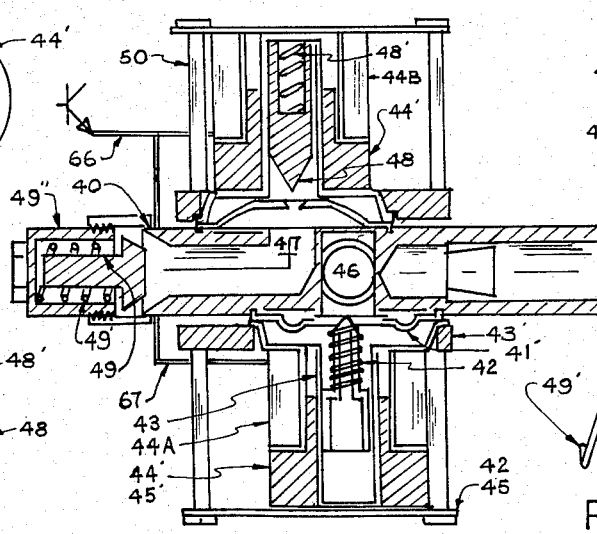
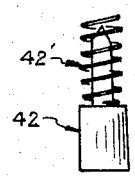

AUXILIARY MECHANICAL AND PHYSICALLY CONTROLLED ELECTRONIC ACTUATED AIR PRESSURE HANDLING APPARATUS FOR TRUCK AND TRAILER BRAKING SYSTEMS

The invention relates to improvements in air pressure handling in application to vehicle brake cylinders and in exhausting air pressure therefrom, allowing the operator more latitude to induce effective traction while braking to reduce the possibility of jack-knifing.

The object of the invention is to provide more effective traction on unstable road surfaces by a rapid intermittent braking application process at approximately 1/6 of a second ON and 1/12 of a second OFF.

Another object is to reduce build-up of a moving surface under the tires by allowing the brakes to release, and then hold intermittently to aid in dispelling foreign material accumulated under the tires.

Still another object is to reduce the hot spots on tires by allowing the brakes to release, and hold intermittently, to prevent locking of the brakes.

Another object is to provide conventional braking under stable road surface conditions.

Another object is to allow the operator to use his own techniques in providing suitable air pressure to the braking process, either conventional or intermittent, to enhance his own safety and the safety of the cargo.

A still further object is to provide an iron magnetic collector intensifying the electro-magnet induction forces on the valve enhancing their rapidity of action.

Another object is to induce valves to open and close independently in sequences.

A still further object of the invention is to provide a switch to nullify the electronic intermittent system control and retain conventional braking upon failure in the electronic system.

The invention will be further described in connection with the embodiments thereof shown in the attached drawings wherein, FIG. 1 shows a bottom portion of a tractor and the general location of the components numbered as they are in the description.

FIG. 2 shows the mechanical and physical switching device arrangement in a cutaway view in a non-active state.

FIG. 3 shows a similar view of the FIG. 2 components in an active state.

FIG. 4 shows a split view of the air-handling assembly 50 with valves in normal position with all parts including a control transistor.

FIG. 5 shows a face view of the stripped block 40 of the air-handling means 50 designating passages and ports and a pressure retaining arrangement.

FIG. 6 shows a split view of an air-handling assembly 50 in air-retaining and cylinder exhausting position as activated in one cycle of the intermittent braking process with a transistor.

FIG. 8 shows a flexible diaphragm which is a portion of a closure of a port.

FIG. 9 shows an iron encompassment to intensify the induction of a coil.

FIG. 10 shows an inlet valve with spring of light tension.

FIG. 11 sows an exhaust valve with spring of heavy tension.

Figure 13:
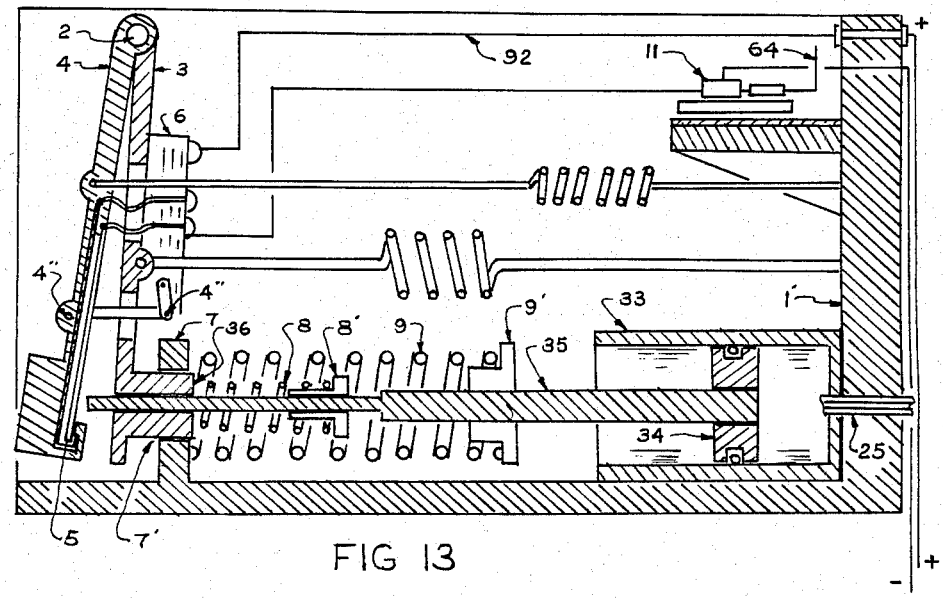

FIG. 12 shows a pressure retaining valve, and,

FIG. 13 is a detailed view of the electro-mechanical controls.

DESCRIPTION

The auxiliary mechanical and physically controlled electronically actuated air pressure handling apparatus incorporated into the braking system of a truck or trailer is described herein, comprising four major components:

(1) A mechanism to equate the braking forces with traction to the reduction of momentum measured by the position of a pendulum which actuates the micro-switch 6 (FIGS. 2, 3, 13) which may supply an electrical current pathway as selected by road surface and traction thereof.

(2) An IC clock circuit supplying rapid suitable intermittent electrical currents to a transistor providing an intermittent electrical pathway from battery to energize the coils which actuate valves.

(3) An air-handling apparatus comprising passages, ports, diaphragms and valves to distribute and release air pressures to and from the braking cylinder.

(4) An iron magnetic collector intensifying the electro-magnet induction forces on the valve, enhancing their rapidity of action of independent opening and closing of the valves in sequences.

DESCRIPTION OF A PREFERRED EMBODIMENT

Assembly 1 (FIGS. 1, 3) is the equator and selector of the mode of braking, frame 1' having round bar 2 (FIGS. 2, 3, 13) extending across upper reaches thereof to become a portion of a pivotal arrangement for hanging pivotal forked bar 3, (See FIG. 3) tensioned by spring 3', (FIG. 2) and hanging pivotal pendulum bar 4, tensioned by spring 4', which is weighted on its lower end to which a safety switch is secured for actuation by the outer extended end of the threaded rod 35. Thus, pivotal forked bar 3 and pendulum bar 4 act as pendulums.

Flat bar 7, (FIGS. 2, 3) extends across lower reaches of frame 1', having opening 7' in its center portion. Monitoring cylinder 33, formed in left hand lower reaches of frame 1', in alignment with opening 7' in flat bar 7, is fitted with air-actuated piston 34 which is secured to threaded rod 35 with spring 8 tensioned by nut 8' and spring 9 and tension nut 9' and bumper plug 36 extending through opening 7' in flat bar 7 to actuate forked bar 3 whereby the pendulum 4 which is connected by rod 4" to micro-switch 6, which is secured to forked bar 3, may provide an electrical pathway by position of pendulum 4 in relation to forked bar 3.

Battery 60 (FIG. 1) is connected from negative post by ground cable 91 to ground 90. Conduit 92, connected to the positive side of battery 60, provides an electrical current pathway to the pressure actuated switch 10 (FIG. 1) with electrical conduit 61 providing electrical current pathway to safety-switch 5, (FIGS. 2, 3, 13). From safety switch 5, conduit 62 provides electrical current pathway to micor-switch 6. Conduit 63 provides electrical current pathway from micro-switch 6 to IC clock circuit 11 which supplies suitable electrical current intermittently by an electrical current path through conduit 64 to transistor 12's base 13, (FIG. 4).

Battery 60 supplies electrical current through electrical current pathway conduit 65 (FIG. 1) to transistor 12's collector 14 and conduit 66 (FIG. 4) from transistor's emitter 15 to coil 44A and conduit 67 from emitter 15 to coil 44B and conduit 68 conducts electrical currents from coil 44A to ground 90. Conduit 69 conducts electrical currents from 44B to ground 90.

A motor-driven air compressor 20 (FIG. 1) supplies air through air line 21 to storage tank 22 and air line 23 extending to foot-actuated metering valve 30 provided with air lines, one line 24 extending to pressure switch 10 and another air line 25 extends to monitoring cylinder 33 (FIGS. 2, 3, 13) and still another air line 26 extending to an electronic air handling apparatus 50 comprising a block 40 (FIG. 4) and having an inlet passage 40' which extends to inlet port 41 which is fitted with diaphragm 41' (FIG. 8) and in conjunction with inlet valve 42 (FIG. 4) which is fitted with light spring 42' forms a closure for port 41. A housing 43 (FIG. 4) encompassing diaphragm 41 (FIG. 5) and valve 42 (FIG. 4) and light spring 42' is held down by plate 43' and is encompassed on its outer end by coil 44A and magnetic collector 44' is secured in place by plate 45, bolts 45' and nuts 45".

Port 41 is intersected by passage 46 where air line 46' extends brake cylinder 70, (FIG. 1) port 47 (FIG. 5) which is fitted with diaphragm 41' (FIG. 8), and in conjuntion with exhaust valve 48 (FIG. 11) and heavy tension spring 48' forms a closure for port 47 (FIG. 5). A valve closure 43 (FIG. 4) is held down by plate 43' which is encompassed on its inner end by a magnetic collector 44' and on the outer end by coil 44B which is secured in place by bolts 45' and nuts 45". From port 47, passage 57' extends outwardly to port 47" which is fitted with valve 49 (FIG. 4) with spring 49', and case 49".

PRINCIPLE OF OPERATION

Motions' resistance to change provides the force to cause a pivotal weighted bar to change positions in relation to the quality of motion change. As the pendulum is an arrangement to open and close an electrical pathway by actuating a switch which is provided with tensions of springs and an air actuated piston in an arrangement to effect the relationship of the pendulum and the forked bar to which the switch is secured which may supply electrical currents to the air-handling apparatus which provide air pressure forces to braking cylinders causing resistance to the turning of the wheels and the surface provides the traction which effects the quality of reduction of momentum. This induces the position of the pendulum that selects the mode of braking, intermittent or conventional. Traction of the wheels affects the movement of the pendulums—if the wheels hold, the pendulums move forward.

The pendulum in relation to a forked bar provided with spring tensions and actuated by a piston propelled by air pressure allows a graduated application of the intermittent rapid ON and OFF braking. This extends to the rapid intermittent braking to a greater degree in resistance to motion as the air pressure is increased. For example, using low air pressure, 10–15 lb. the intermittent braking will allow the pendulum to move forward out of the intermittent range at a lesser pace of speed reduction to induce the conventional braking process than if the air pressures are increased, requiring greater speed reduction before the conventional braking process is in effect. The pendulum is provided with a safety switch which may be actuated by the end of a rod extending from the piston in the monitoring cylinder that is pressure-actuated and will nullify the overriding braking process should it become ineffective.

OPERATION

Assume the invention is applied to a truck and trailer traveling at a speed suitable for the conditions of the highway:

The compressor 20 (FIG. 1) when on supplies air pressures of approximately 100 to 110 lbs. per in. to air tank 22 which has exit air line 23 to a foot pedal actuated metering valve 30 to provide air pressure in the braking process to slow or stop the truck and trailer according to the operator's option. He may touch the pedal lightly as he desires allowing metered air pressure to be supplied through air line 24 (FIG. 1) extending to pressure switch 10 and another air line 25 (FIG. 2) extending to monitoring cylinder 33 and still another air line 26 extending to air handling apparatus 50 (FIG. 1) which is equipped with an inlet valve 42, (FIG. 10) that is normally opened by spring pressure and gravity, allowing air pressure through air passage 46 (FIG. 4) and air line 46' to brake cylinder 70 (FIG. 1) to expand where air is retained by the normally closed exhaust valve 48, (FIG. 4). This order results in conventional braking.

Should greater pressure be applied to the foot pedal, increasing the air pressure, as supplied by the metering valve 30 (FIG. 1) to a point to close contacts in the pressure switch 10, providing an electrical pathway from the battery 60 (FIG. 1), through conduit 92, which is an electrical pathway from battery 60 (by conduit 92 (FIGS. 3, 13) to conduit 61) to safety switch 5 (FIGS. 2, 3, 13) which is provided with conduit 62 to micro-switch 6. As equal pressure has been raised in the monitoring cylinder 33 (FIGS. 2, 3, 13), and in the braking cylinder 70, (FIG. 1) which restricts the turning of the wheel; and should the traction be effective in reducing the momentum of the truck and trailer, the pendulum arm 4 (FIGS. 2, 3, 13) being attached by rod 4" to micro-switch 6, which is secured to forked bar 3, is only restricted from forward travel by the light tension of spring 4'. Forked bar 3 is restricted from forward travel by the heavy tension of spring 3'. However, if traction effectively reduces the momentum causing the pendulum arm 4 to overcome restriction of spring 4' light tension to swing forward to a pre-designated angle causing the opening of the electrical circuit of micro-switch 6, then conventional braking continues.

But, should traction be reduced to a point where the quality decrease of momentum deteriorates to the point where spring 4' tension may withdraw the pendulum which is connected to micro-switch 6 closing the contacts, an electrical pathway is provided through conduit 63 (FIG. 2) to IC clock circuit 11 (FIGS. 2, 3, 13) which supplies, through conduit 11; electrical time-space current intermittently to a transistor 12's base 13 which is supplied by electrical current from battery 60 through conduit 64 to transistor 12's collector base and conduit 65 from transistor's emitter 15 to coils 44A (FIG. 4).

Conduit 66 (FIG. 4) is a pathway for electrical currents from emitter 65 to coil 44B and conduit 67 (FIG. 4) conducts electrical currents from coil 44A to ground 90. Conduit 68 (FIG. 4) conducts electrical currents from 44B to ground 90. When coils 44A and 44B are energized simultaneously, inlet valve 42 (FIGS. 4, 10) is lifted by induction against light spring tension 42' to close inlet port 41 early and as the electrical current is supplied simultaneously through coils 44B, also energizing it, by induction, and lifts valve 48, against heavier spring 48', to open exhaust port 47 later, where a predetermined pressure to retain brake shoe in position is retained in the exhaust passageway by valve 49 (FIG. 4) fitted with spring 49' and tensioned by case 49".

When the flow of each intermittent current ceases through coils 45A and 45B, the greater spring tension 48' will cause the exhaust valve 48 to close early and the lighter spring 42' will cause inlet valve 42 to open later. This opening and closing of valves will continue until suitable traction is established to provide the quality of reduction of momentum causing the pendulum to move forward and thus allowing the flow of electrical currents to cease to air handling apparatus and resulting in conventional braking.

The mechanism to equate the braking force with the traction to the reduction of momentum is provided as a safety feature to identify unstable road surfaces and provide suitable braking action. It also allows the intermittent braking to be extended into higher air pressure effectiveness.

Figure 7:
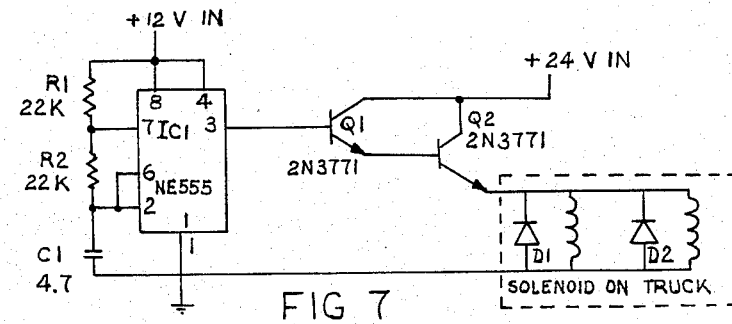
FIG. 7 shows the IC clock circuit.
Figure 7A:
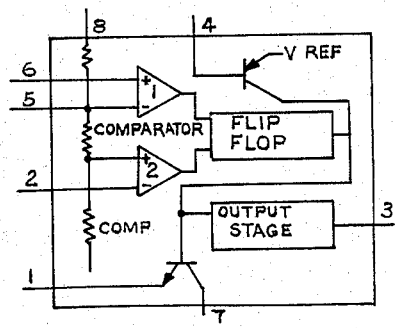
FIG. 7a is a chip circuit.

The power for the pulse timer of FIG. 7 is supplied from the pendulum switch mechansim. The pulse timer consists of standard components. Using an oscillator/-timer $IC_1$ (NE555) controlled by $R_1 R_2$ & $C_1$ which sets pulse rate to transistors $Q_1$ & $Q_2$ (2N3771). These high current transistors supply the voltage for the brake solenoids. The diodes ($D_1$ & $D_2$) on each solenoid coil are bleeders which allow faster solenoid operation.

By changing $R_1 R_2$ & $C_1$, the pulse rate can be increased or decreased.

The brakes are actuated as follows:

Brake foot valve 30 (FIG. 1) is depressed by the operator, permitting high pressure air from tank 22 to pass along conduits 26 to valves 50, operated electrically to operate air pressure brake diaphragm actuators 70. The IC flip-flop circuit of FIG. 7 controls the on-off pressure application via valves 50 which intermittently supply and discard actuator air.

If the brakes hold, pendulums 3 and 4 (FIGS. 2, 3, 13) move forward so the pendulum contact circuit continues to energize the IC chip circuit 11 to apply the intermittent electrical current to valve 50 for intermittent operation.

If the brakes do not hold, pendulum 4 won't move far enough forward, such that rod 35 opens contacts 5, cutting off energy to the IC circuit, which then no longer releases air from brake actuators 70 via valve 50.

Air piston 34 (FIGS. 2, 3, 13) receives air from conduit 25 which extends to common pressure line 26 (FIG. 1), in turn connected through foot valve 30 to tank 22. Pressure switch 10 is connected to air source valve 30 (foot valve).

The IC circuit of FIG. 7 is a flip-flop conventional circuit commerically available chip, shown at 11, to interrupt the current to valves 50 by way of lead 64 (FIG. 2 to FIG. 1). It is simply an on-off device to current flow to cause the intermittent valve operation.

Safety switch 5 of FIG. 3 is provided to interrupt the current to the IC chip (i.e.) the intermittent action when the brakes fail to slow the car, and heavy pressure on the brake foot pedal causes rod 35 to open contacts 5 as it moves to the left to push pendulum 1 (FIGS. 13, 3) away from the contact carried by pendulum 4.

Switch 6 is a microswitch operated by arm 4" extending from pendulum 4. It is normally open and when pendulum 4 swings forward, it closes to complete a circuit for the IC chip.

Inlet and exhaust valves of FIG. 4 are operated by current energizing coils to operate these valves. Inlet valve 42 is normally open and exhaust valve 44B is normally closed. Energizing coil 44A causes the inlet valve 42 to close. Also, exhaust valve 44B opens, allowing the air in the cylinder to exhaust. When the current is cut off, spring 48' closes exhaust valve and spring 42 opens the inlet valve. High pressure air is fed into brake cylinder 70. When the coils are energized, the air is shut off from the common air passges 70, and simultaneously current in coils 44B opens valve 48, permitting air to exhaust from cylinder 70.

Braking is intermittent when pendulum contacts are closed to provide a circuit to IC chips 11, causing the on/off current application to valves 50. However, when pendulum contacts are open, IC chips 11 are de-energized and valves 50 remain open to supply air pressure to the actuators 70, as usual in conventional braking.

The function of transistor 12 is to energize coil 44A.

The function of coils throughout is to operate the valves.

The function of ports throughout is to serve as passages for the air.

The function of valves is to open and close air passages.

The function of the diaphragms is to open and close increased size air passages.

I claim:

1. Apparatus for selectively converting a vehicle conventional air braking system to an intermittent air braking system wherein electrically responsive brake actuator means apply brakes, in response to depression of the brake pedal, intermittently unless an intermittent action is cancelled and conventional braking is used, comprising in combination:

an electrical circuit for generating intermittent electrical output power connected to energize said actuator means;

an energizing electrical connection including a mechanically actuable switch for said circuit;

a switch actuator pendulum;

a safety rod movable from a home position by actuation of the brake pedal;

means biasing the pendulum against an end of said rod;

means connecting the pendulum to actuate said switch to a closed position when the pendulum swings forward relative to the vehicle as the vehicle is slowing thereby establishing energization of said circuit for intermittent brake operation;

a level detecting pendulum;

a slide carried by the safety rod;

means biasing the level detecting pendulum against the slide in a substantially vertical position;

means biasing the slide against the level detecting pendulum;

said switch carried by said level detecting pendulum whereby the level detection pendulum is pressed forward of its vertical position further when the vehicle is braking on a down slope than on an up slope;

a third pendulum adjacent to the switch actuator pendulum and carrying a contact normally making electrical connection with a contact carried by the switch actuator pendulum with the contact of the switch actuator pendulum and the contact of the third pendulum being in the energizing electrical connection for said circuit; and, said safety rod disabling the intermittent action upon extreme depression of the brake pedal by pushing against said third pendulum to separate the third pendulum contact from the switch actuating pendulum contact.

2. A method for selectively adding intermittent braking to a vehicular air braking system by only intermittently powering brake actuator means in response to depression of a brake pedal while permitting conventional braking by greater braking pressure, comprising the steps of:

using a first pendulum to energize an intermittent powering circuit for said actuator means when the vehicular momentum is reduced by braking;

using a second pendulum to enable said first pendulum to energize said circuit regardless of slope of the vehicle; and, using a safety switch to permit loss of traction to interrupt said energization.

* * * * *